United States Patent [19]
Maier

[11] 3,864,682
[45] Feb. 4, 1975

[54] BINARY PHASE CODED NAVIGATION SYSTEM (BICONS)

[76] Inventor: James J. Maier, 37 Kellogg St., Utica, N.Y. 13323

[22] Filed: Sept. 12, 1969

[21] Appl. No.: 857,403

[52] U.S. Cl........ 343/113 R, 343/100 CL, 343/114
[51] Int. Cl.............................................. G01s 5/02
[58] Field of Search ............. 343/113, 100 CL, 114

[56] References Cited
UNITED STATES PATENTS

| | | | |
|---|---|---|---|
| 2,962,714 | 11/1960 | Meixell et al............. | 343/100 CL X |
| 3,145,341 | 8/1964 | Andrew ............................ | 343/114 |
| 3,346,862 | 10/1967 | Raudsep ............................ | 343/113 |
| 3,526,895 | 9/1970 | Moutilvault et al...... | 343/100 CL X |

OTHER PUBLICATIONS
IEEE—Transactions in Space Electronics and Telemetry, June 1962, "A Skin Tracking Radar Experiment Involving The Courier Satellite," by M. Easterling pp. 76–84.

Primary Examiner—Maynard R. Wilbur
Assistant Examiner—S. C. Buczinski
Attorney, Agent, or Firm—Harry A. Herbert, Jr.; George Fine

[57] ABSTRACT

An apparatus for navigating an aircraft utilizing a pair of antennas which are fixed to the aircraft to receive a binary phase coded signal from a beacon. The correlation of the received binary phase coded signals from the antennas provides an indication of the aircraft's direction.

5 Claims, 3 Drawing Figures

PATENTED FEB 4 1975　　　　　　　　　3,864,682

INVENTOR.
JAMES J. MAIER
BY Harry A. Herbert Jr
   George Fine
   ATTORNEYS

BINARY PHASE CODED NAVIGATION SYSTEM (BICONS)

BACKGROUND OF THE INVENTION

The present invention relates broadly to an aircraft navigational apparatus, and particularly with an improved means for determining the RF phase difference between signals which are received at the aircraft from a ground located beacon which emits a phase-coded carrier signal.

In the prior art, various means have been employed to navigational information to the operator of an aircraft. A few of the prior art operational systems which have been utilized to perform this function are the Tactical Aerial Navigation (TACAN) and the VHF Omni-directional Radio Range (VOR) systems. Multiple reflections which are caused by terrain features can severely degrade the performance of the TACAN system. The ever present difficulties of co-channel interference present an additional problem in the proper operation of the TACAN system. This problem is analogous to interference from a similiar transmitter because the airborne receiver is receiving TACAN returns from more than one ground station. The TACAN system by necessity requires a large bandwidth to accomplish its purpose since the air-to-ground band is 1025–1150 mhtz and the ground-to-air band is in the 962–1024 mhtz and the 1151–1213 mhtz ranges.

The prior art apparatus utilizing the principle of the VOR system requires a comparison of the phase difference between two frequencies. One of the two frequencies is utilized as the reference phase with respect to which the other variable phase is measured. The navigational tolerances of the prior art systems, the TACAN and the VOR, are in the order of several degrees and may be considered quite large in view of most fine airborne navigational requirements. In the present invention, the navigational error will be proportional to the bit width of the coded pulse. Therefore, if a 1 microsecond pulse is used, the navigation tolerance will be less than 1°. A greater navigational tolerance may be achieved by utilizing a faster code pulse rate.

SUMMARY

The present invention utilizes an interferometer and binary phase coding correlation to provide navigational information to the operator of an aircraft. Two antennas are attached to the aircraft to receive a binary phase coded signal from a beacon. The r-f phase difference between the signals which are received by the two antennas is a function of the wavelengths of the signal. When the binary phase coded signal is proportional to the wavelength of the transmitting signal beacon, a correlation of the signals from the two antennas will indicate that the aircraft is on course. A precision course measurement may also be obtained by delaying one signal from the other. The increments of the angles from the normal to the beacon will be proportional to the measured delay and thus will provide a measurement of the aircraft's course.

It is one object of the invention, therefore, to provide an improved navigation system having the capability to accurately measure course angle relative to the signal beacon.

It is another object of the invention to provide an improved navigation system having a navigational tolerance of less than 1°.

It is another object of the invention to provide a navigation system having an interferometer and binary phase coding correlation to provide accurate navigational information.

It is yet another object of the invention to provide a navigation system having a navigational error which is proportional to the bit width of the coded pulse.

It is still another object of the invention to provide a navigation system having the capability of rejecting any reflected signals which are cause by multiple transmission paths.

These and other advantages, features and objects of the invention will become more apparent from the following description taken in connection with the illustrative embodiments in the accompanying drawings, wherein:

DESCRIPTION OF THE PREFERRED EMBODIMENT

Figure 1:
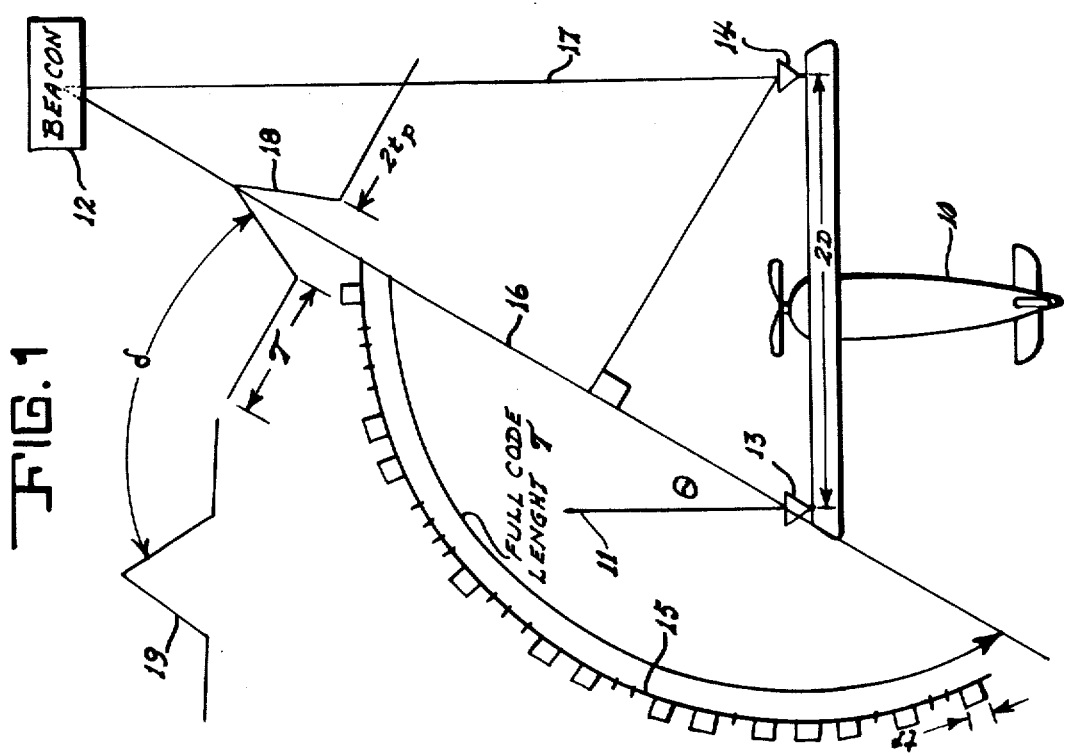
FIG. 1 is a pictorial representation of a typical mode of operation of this invention utilizing two antennas fixed to an aircraft's wings.

Referring now to FIG. 1, there is shown an aircraft 10 on a heading 11 with respect to beacon 12. The term, heading, as used in this specifcation is defined as: the course or direction of movement of an aircraft. The definition of course, as utilized in this specification, is the same as the definition given for the term, heading. The terms will be used interchangeably and are utilized as the reference lines from which angular measurements are made. The twin antennas 13, 14 which are essential to the operation of the system are shown mounted at the wing tips of the aircraft 10. The two antennas 13, 14 on the aircraft 10 are utilized for signal correlation of a binary phase coded signal which may be transmitted by a ground or airborne beacon. Each antenna 13, 14 may feed either its own channel to a receiver-correlator, or each antenna could have its own receiver, after which each receiver output could be correlated. In either case, the signals that are being correlated are the binary phase coded signals from the two antennas 13, 14. The binary phase coded signal may be transmitted by a beacon, which is interrogated by the aircraft. However for the present illustration the beacon, does not need to be interrogated, but is either a passive beacon device or a beacon that needs no interrogations. However, it should be understood that a system utilizing an interrogation and a PRF similar to other beacon systems is within the scope of the present invention.

The beacon 12 which is a ground located beacon emits a phase coded carrier signal 15. The ground-based beacon 12 comprises a sequence generator. The beacon 12 will be modulated by the sequence generator which provides a pseudo-random code. The phase coded carrier signal 15 is shown for a full code length T. One bit period is shown as $t_p$. The signal path 16 is a direct transmission path from signal beacon 12 to antenna 13, while signal path 17 is the direct transmission path to antenna 14. When aircraft 10 is on a flight path directly to signal beacon 12, a correlation waveform 18 will result and will appear as shown in FIG. 1 when a visual monitoring device is utilized. Under these specific conditions a correlation of the received phase coded signal occurs when $\tau = 0$, $\phi = 0$ and $\theta = 0$; where $\tau$ is the delay time between the signals on paths 16, 17: $\phi$ is the phase difference between the signals and $\theta$ is the ange of deviation of the aircraft's heading relative to the signal beacon 12. The r-f phase difference between the signals from paths 16, 17 received through the two antennas 13, 14 is a function of the wavelength of the signal. When the binary phase coded signal 15 is proportional to the wavelength of the signal, a correlation of both signals from the two antennas 13, 14 will occur when the aircraft 10 is on a heading toward the beacon It should be understood that for a given flight situation, i.e. whether the aircraft is exactly on a heading to the beacon or on some deviation thereof, there will only be one correlation signal. This is quite clear when the aircraft is on a heading directly to the beacon. When the aircraft is on a heading other than directly to the beacon, a correlation will not occur until a proper amount of delay is switched into the appropriate antenna channel to make the signals coincident. When the signals are coincident, a correlation signal will result. A precise measurement of the aircraft's course for angular deviations from a heading to the beacon is accomplished by delaying one signal from the other. The angular deviation will be proportional to the amount of the delay which is utilized. Therefore, it may be clearly seen that accurate course measurements may be obtained by utilizing the binary phase coded navigation system to provide heading information.

Figure 2:
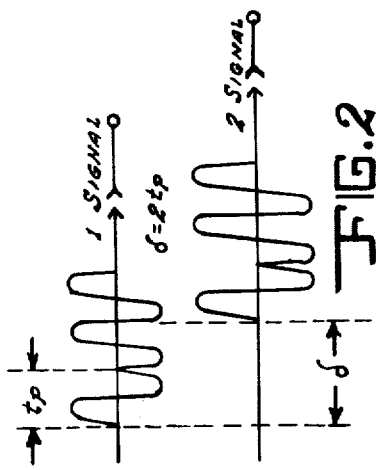
FIG. 2 is a graphic representation of two binary phase coded signals out of phase with one another.

In FIG. 2, there is shown in carrier frequency form a phase coded signal having a phase difference, $\delta$, equal to two $tp$, where $tp$ represents a pulse bit period. Assuming that a signal having such a phase difference, $\delta$ was received by the present invention, then before any correlation between the signals could be made, a delay equal to $\delta$ must be inserted into the channel receiving signal 1 in order for the signals 1 and 2 to be coincident and a correlation pulse be generated. In FIG. 1 the correlation pulse 19 represents the output of the correlation unit for signals having a phase difference $\delta$.

The auto-correlation function is given by the expression:

$$R(\tau) = \int_{-\infty}^{\infty} s(t)s(t-\tau)dt = \int_{0}^{T} s(t)s(t-\tau)dt$$

where, $\tau$ as previously defined is the delay time between the signals, $s(t)$ represents the reference signal, and $s(t-\tau)$ represents the variable signal relative to the reference signal. The integral limits of $-\infty$ to $\infty$ may be changed mathematically to the limits of 0 to $T$, where $T$ is the full code length, since the binary phase coded signal is zero during all periods other than the interval of the limits 0 to $T$. The present invention performs an integration only over the duration of the total phase coded signal. The maximum correlation between the two signals occurs at $\tau = 0$. In a binary phase code (such as an M sequence), there is correlation when the code matches up within one bit period $tp$. There is no correlation if the code is unmatched greater than the bit $tp$ up to the full code length T. The result of no correlations occurring either within a bit time $\tau$ or greater up to the length of the Code T is utilized to provide fine navigational measurements of an aircraft's heading from which the aircraft course may be determined. Therefore, $\tau$ starts peaking from $\tau=y_p$ to $\tau=0$, to provide maximum correlation when $\tau=0$.

The present invention by its nature correlates the signals thru the two antennas to determine the angle from the aircraft's heading to the beacon. Thus, the delay introduced in the channels matches the delayed signal to the reference in the other channel thereby rejecting any reflected signals caused by multipath. Since the auto-correlation is very sharp, any other phase delays are down in the sidelobes of the correlation function. The prior art problems of co-channel interference is improved by providing different pseudo-random codes to different beacons. By suitably selecting a family of codes that provide low correlation properties to one another, several beacons can utilize the same frequencies and avoid co-channel interference. This technique can save bandwidth because instead of one station utilizing one channel, several stations can utilize one channel. In addition, there is a signal-to-noise enhancement as a result of the correlation, thereby enhancing the signal.

The following illustration for a distant target will further clarify the operating principles of the present invention. The phase difference, $\phi$ of the signal waves arriving from a distant target (the beacon) to the two antennas is given by:

$$\phi = (2\pi/\lambda)(R_1 - R_2)$$

where $\lambda$ is the wavelength of the radio waves and referring to FIG. 1, $R_1$ is signal path 16, and $R_2$ is signal path 17. By utilizing trigonometric relationships, the above equation may be simplified to:

$$\phi = (2\pi/\lambda)(2D \sin \theta)$$

where 2D is the distance between the two antennas 13, 14 on the aircraft 10 and $\theta$ is the angular deviation to the beacon. Thus the measurement of $\theta$ will be the value of the angle $\theta$. In order to have a proper correlation, it is necessary to calculate compatible binary phase code rates, carrier frequency, and the length of the code. The length of the code is necessary so that a good correlation for that particular length may be realized and that no correlations may occur for a full 180° turn of the aircraft. If a code length can not be found equal to the full 180°, a count down could be made for a shorter length code to obtain the same results. Thus when $\tau$ is proportional to $\phi$, the phase difference, there is no correlation except when the plane is heading directly toward the beacon. In addition to the maximum correlation since the maximum correlation occurs only when the aircraft is directly on course, delays which are inserted in each antenna channel could be utilized to measure the angle $\theta$ and thus, a course heading can be obtained. A zero delay would provide the correlation for an on-course heading. When the aircraft is not on a course directly to the beacon, increments of delay which are proportional to the angle $\theta$ may be utilized to tell the navigator exactly the number of degrees the aircraft is off course.

Figure 3:
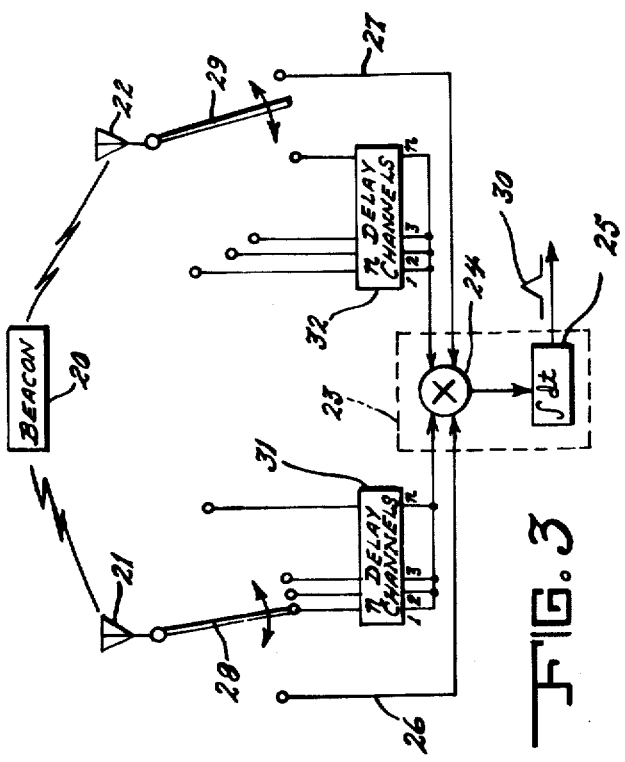
FIG. 3 is a block diagram of the binary phase coded navigation system in accordance with this invention.

FIG. 3 shows the block diagram of a preferred embodiment of the present invention. The beacon 20 transmits a signal to both antennas 21, 22. When the aircraft is directly on course, switch 28 will connect antenna 21 through signal path 26 to the correlator unit 23 and switch 29 will connect antenna 22 through signal path 27 to correlator 23 also. The correlator unit 23 which is comprised of multiplier 24 and integrator 25 will, according to the auto-correlation equation, produce a correlation pulse 30. When the aircraft is not directly on course to the beacon 20, either switch 28 or 29 may be thrown to connect either antenna 21 or 22 to its respective $n$-delay channel unit 31 or 32. The navigator will be able to tell whether the aircraft is to the left or right of the beacon 20 by observing which delay unit he utilized to obtain a correlation pulse. The angular deviation from the beacon 12 may be read directly from the value of the delay switched into the particular channel, since the delay is proportional to the angular deviation.

Although the invention has been described with reference to a particular embodiment, it will be understood to those skilled in the art that the invention is capable of a variety of alternative embodiments within the spirit and scope of the appended claims. For example, the present invention may also be utilized for a ground controlled approach system. The only prior art comparable system is the Precision Approach radar (PAR) system. The range of the PAR system is limited to 10 to 20 miles, azimuth is limited to 20° and elevation is limited to 7°. There are no known limitations in azimuth and elevation in the present system due to the concept 180° coverage and the theoretical linear operation of the system through the 180° coverage. The distinct advantages of the present invention are the increased range, the one-way transmission path, the signal to noise enchancement and the use of a frequency which does not degrade appreciably in rainy weather.

I claim.

1. A binary phase coded navigation system in combination comprising:
   a ground-based beacon emitting a carrier frequency, said carrier frequency being phase coded to provide a binary phase coded signal, said binary phase coded signal being a pseudo-random code, said binary phase coded signal having a code length,
   a first airborne receiving means for receiving said binary phase coded signal,
   a second airborne receiving means displaced from said first airborne receiving means by a predetermined distance, said second airborne receiving means also receiving said binary phase coded signal, and
   a correlation means connected to said first and second receiving means, said correlation means correlating said binary phase coded signals from said first and second airborne receiving means to provide a correlation pulse.

2. A binary phase coded navigation system as described in claim 1 wherein said ground-based beacon comprises a sequence generator providing a pseudo-random code.

3. A binary phase coded navigation system as described in claim 1 wherein said correlation unit comprises a multiplier unit for multiplying said binary phase coded signals from said first and second airborne receiving means and integrator for integrating said multiplied binary phase coded signal over the duration of the total code length.

4. A binary phase coded navigation system as described in claim 1 further including a first $n$-delay channel unit having a plurality of delay channels, a first switching means for connecting said first airborne receiving means directly through said first $n$-delay channel unit to said correlation means, a second $n$-delay channel unit having a plurality of delay channels, a second switching means for connecting said second airborne receiving means directly through said second $n$-delay channel unit to said correlation means.

5. A binary phase coded navigation system as described in claim 4 wherein said first switching means connects said first airborne receiving means directly through said first $n$-delay channel unit to said correlation means, and said second switching means connects said second airborne receiving means directly to said correlation means.

* * * * *